(12) United States Patent
Koakutsu et al.

(10) Patent No.: US 11,318,448 B2
(45) Date of Patent: May 3, 2022

(54) HYDROPROCESSING CATALYST FOR THE REDUCTION OF METALS AND SULFUR IN HEAVY FEEDS

(71) Applicant: ADVANCED REFINING TECHNOLOGIES LLC, Columbia, MD (US)

(72) Inventors: Yosuke Koakutsu, Tokyo (JP); Koichi Matsushita, Tokyo (JP); Matthew P Woods, Pasadena, MD (US)

(73) Assignee: ADVANCED REFINING TECHNOLOGIES LLC, Columbia, MD (US)

( * ) Notice: Subject to any disclaimer, the term of this patent is extended or adjusted under 35 U.S.C. 154(b) by 87 days.

(21) Appl. No.: 16/960,953

(22) PCT Filed: Jan. 25, 2019

(86) PCT No.: PCT/US2019/015107
§ 371 (c)(1),
(2) Date: Jul. 9, 2020

(87) PCT Pub. No.: WO2019/152268
PCT Pub. Date: Aug. 8, 2019

(65) Prior Publication Data
US 2020/0360903 A1 Nov. 19, 2020

Related U.S. Application Data

(60) Provisional application No. 62/624,236, filed on Jan. 31, 2018.

(51) Int. Cl.
*B01J 23/74* (2006.01)
*B01J 23/883* (2006.01)
(Continued)

(52) U.S. Cl.
CPC .............. *B01J 23/883* (2013.01); *B01J 21/04* (2013.01); *B01J 23/42* (2013.01); *B01J 23/44* (2013.01); *B01J 23/464* (2013.01); *B01J 23/468* (2013.01); *B01J 23/64* (2013.01); *B01J 23/652* (2013.01); *B01J 23/6522* (2013.01); *B01J 23/6525* (2013.01); *B01J 23/6527* (2013.01); *B01J 23/75* (2013.01); *B01J 23/755* (2013.01); *B01J 23/84* (2013.01); *B01J 23/85* (2013.01); *B01J 23/86* (2013.01); *B01J 23/864* (2013.01); *B01J 23/866* (2013.01); *B01J 23/88* (2013.01); *B01J 23/882* (2013.01); *B01J 23/888* (2013.01); *B01J 23/8885* (2013.01); *B01J 35/002* (2013.01); *B01J 35/0006* (2013.01); *B01J 35/108* (2013.01); *B01J 35/109* (2013.01); *B01J 35/1019* (2013.01); *B01J 35/1038* (2013.01); *B01J 35/1042* (2013.01); *B01J 35/1061* (2013.01); *B01J 35/1095* (2013.01); *B01J 37/0009* (2013.01); *B01J 37/0201* (2013.01); *B01J 37/0205* (2013.01); *B01J 37/088* (2013.01); *B01J 2523/31* (2013.01); *B01J 2523/67* (2013.01); *B01J 2523/68* (2013.01);
(Continued)

(58) Field of Classification Search
CPC ... B01J 21/04; B01J 23/42; B01J 23/44; B01J 23/464; B01J 23/468; B01J 23/64; B01J 23/86; B01J 23/864; B01J 23/84; B01J 23/75; B01J 23/755; B01J 23/85; B01J 23/88; B01J 23/888; B01J 23/882; B01J 23/883; B01J 23/866; B01J 23/8885; B01J 23/652; B01J 23/6522; B01J 23/6525; B01J 23/6527; B01J 35/1019; B01J 35/1038; B01J 35/1042; B01J 35/1061; B01J 35/108; B01J 35/109; B01J 35/1095; B01J 35/002; B01J 35/0006; B01J 37/0201; B01J 37/088; B01J 37/0205; B01J 37/0009; B01J 2523/00; B01J 2523/31; B01J 2523/68; B01J 2523/845; B01J 2523/847; B01J 2523/822; B01J 2523/824; B01J 2523/827; B01J 2523/828; B01J 2523/67
USPC ....... 502/300, 305, 313, 314, 315, 319, 320, 502/321, 322, 323, 325, 326, 327, 332, 502/333, 334, 335, 337, 339, 355
See application file for complete search history.

(56) References Cited

U.S. PATENT DOCUMENTS 3,900,427 A * 8/1975 Riley ...................... B01J 21/04
502/255
4,154,812 A 5/1979 Sanchez et al.
(Continued)

OTHER PUBLICATIONS

Barrett, E.P. et al., "The Determination of Pore Volume and Area Distributions in Porous Substances. I. Computations from Nitrogen Isotherms," J. Am. Chem. Soc., dated Jan. 1, 1951, vol. 73 (1), DOI: 10.1021/ja01145a126, pp. 373-380.

(Continued)

*Primary Examiner* — Elizabeth D Wood
(74) *Attorney, Agent, or Firm* — Foley & Lardner LLP

(57) ABSTRACT

A catalyst comprising a carrier and a metals component impregnated in the carrier, the carrier comprising alumina; and the metals component comprising a first metals fraction and a second metals fraction, the first metals fraction comprising at least one metal selected from chromium, molybdenum, or tungsten, and the second metals fraction comprising at least two metals selected from cobalt, rhodium, iridium, nickel, palladium, or platinum, wherein the catalyst has a first pore volume of 0.28 to 0.45 mL/g for pores having a pore diameter of 12 nm to less than 16 nm, and a second pore volume of 0.15 to 0.28 mL/g for pores of 2.0 nm to less than 12.0 nm.

20 Claims, No Drawings

(51) Int. Cl.
| | |
|---|---|
| *B01J 21/04* | (2006.01) |
| *B01J 35/10* | (2006.01) |
| *B01J 37/02* | (2006.01) |
| *B01J 23/46* | (2006.01) |
| *B01J 23/64* | (2006.01) |
| *B01J 23/86* | (2006.01) |
| *B01J 23/42* | (2006.01) |
| *B01J 23/44* | (2006.01) |
| *B01J 23/84* | (2006.01) |
| *B01J 23/755* | (2006.01) |
| *B01J 23/888* | (2006.01) |
| *B01J 23/88* | (2006.01) |
| *B01J 23/85* | (2006.01) |
| *B01J 23/882* | (2006.01) |
| *B01J 23/75* | (2006.01) |
| *B01J 23/652* | (2006.01) |
| *B01J 35/00* | (2006.01) |
| *B01J 37/08* | (2006.01) |
| *B01J 37/00* | (2006.01) |

(52) U.S. Cl.
CPC .... *B01J 2523/822* (2013.01); *B01J 2523/824* (2013.01); *B01J 2523/827* (2013.01); *B01J 2523/828* (2013.01); *B01J 2523/845* (2013.01); *B01J 2523/847* (2013.01)

(56) References Cited

U.S. PATENT DOCUMENTS

| | | | |
|---|---|---|---|
| 5,334,307 A | | 8/1994 | Simpson et al. |
| 5,545,602 A | | 8/1996 | Nelson et al. |
| 5,827,421 A | * | 10/1998 | Sherwood, Jr. ........ C10G 45/08 502/313 |
| 6,200,927 B1 | * | 3/2001 | Shukis .................... B01J 23/85 502/313 |
| 6,403,526 B1 | | 6/2002 | Lussier et al. |
| 8,206,575 B2 | | 6/2012 | Maesen et al. |
| 2005/0109674 A1 | | 5/2005 | Klein |
| 2014/0124410 A1 | | 5/2014 | Rayo Mayoral et al. |
| 2015/0321177 A1 | * | 11/2015 | Rana .................... B01J 35/1061 208/253 |
| 2017/0165639 A1 | | 6/2017 | Klein et al. |

OTHER PUBLICATIONS

Brunauer, S. et al., "Adsorption of Gases in Multimolecular Layers," Journal of the American Chemical Society, dated Feb. 1, 1938, vol. 60 (2), DOI: 10.1021/ja01269a023, pp. 309-319.
International Search Report of the International Searching Authority for PCT/US2019/015107 dated Mar. 26, 2019.
Extended European Search Reporton EP Application No. 19746973.7 dated Sep. 27, 2021 (6 pages).
International Preliminary Report on Patentability on PCT/US2019/015107 dated Aug. 4, 2020 (7 pages).

* cited by examiner

US 11,318,448 B2

HYDROPROCESSING CATALYST FOR THE REDUCTION OF METALS AND SULFUR IN HEAVY FEEDS

RELATED APPLICATIONS

This application claims priority and the benefit of the filing date of U.S. Provisional Patent Application No. 62/624,236 filed Jan. 31, 2018, the disclosures of which are hereby incorporated herein by reference.

FIELD OF THE INVENTION

The invention relates to a hydroprocessing catalyst. More particularly, the invention relates to a hydroprocessing catalyst having a three-metal composition and a particularly designed pore network for improved demetallization capability and sulfur removal.

BACKGROUND OF THE INVENTION

There is a trend in refineries towards processing more economical, heavier crudes containing increased percentages of high boiling point components such as atmospheric resid and vacuum resid. These components contain high levels of sulfur, nitrogen, nickel and vanadium which cause complications during downstream processing. In these applications, nickel and vanadium may take the form of a porphyrin compound and the removal of nickel is generally more difficult than removal of vanadium. It is advantageous to treat these heavier crudes to remove metals, sulfur and nitrogen, and to saturate hydrocarbons for several reasons. First, removal of sulfur and nitrogen permits compliance with environmental standards in downstream units. Second, removal of contaminant metals protects downstream unit catalysts, such as those used in the catalytic reformer, fluid catalytic cracking or isomerization units.

There has been an ongoing effort to develop hydroprocessing catalysts with improved activity with respect to sulphur removal and demetallization. U.S. Pat. No. 5,334,307 discloses a hydroprocessing catalyst having an amorphous, porous refractory oxide support containing between 2 and 8 weight percent of silica. U.S. Pat. No. 5,545,602 discloses a catalyst having an alumina support, a group VIII non-noble metal oxide, a Group VI-B metal oxide, and 0-2 wt % of a phosphorus oxide. Nevertheless, there is an ongoing need for hydroprocessing catalysts having improved activity and activity retention with respect to sulphur and metals removal, especially nickel. It has unexpectedly been found that such improvements are possible using a catalyst having a particular three-metal formulation and a specifically designed pore structure.

SUMMARY OF THE INVENTION

The subject matter of the present disclosure relates to a hydroprocessing catalyst having a unique three-metal formulation with a particularly defined pore size distribution that provides exceptional sulfur and metals removal activity, particularly with respect to nickel.

In an embodiment, the present disclosure provides a catalyst comprising a carrier and a metals component impregnated in the carrier. The carrier comprises alumina, and the metals component comprises a first metals fraction and a second metals fraction, the first metals fraction comprising at least one metal selected from chromium, molybdenum, or tungsten, and the second metals fraction comprising at least two metals selected from cobalt, rhodium, iridium, nickel, palladium, or platinum. The catalyst has a first pore volume of 0.28 to 0.45 mL/g for pores having a pore diameter of 12 nm to less than 16 nm, and a second pore volume of 0.15 to 0.28 mL/g for pores of 2.0 nm to less than 12.0 nm.

In another embodiment, the present disclosure provides a process for producing a catalyst, the process comprising impregnating a metals component onto a carrier. The carrier comprises alumina, and the metals component comprises a first metals fraction and a second metals fraction. The first metals fraction comprises at least one metal selected from chromium, molybdenum, tungsten, or mixtures thereof, and the second metals fraction comprises at least two different metals selected from cobalt, rhodium, iridium, nickel, palladium, platinum or mixtures thereof. The catalyst has a first pore volume of 0.28 to 0.45 mL/g for pores having a pore diameter of 12 nm to less than 16 nm, and a second pore volume of 0.15 to 0.28 mL/g for pores of 2.0 nm to less than 12.0 nm.

DETAILED DESCRIPTION OF THE INVENTION

For the purpose of this specification, the term "boehmite" or "pseudoboehmite" means a solid alumina material of formula $Al_2O_3.H_2O$ and having an x-ray diffraction pattern of which shows broad lines that coincide with the major reflections of well crystallized γ-AlOOH, and will be used interchangeably.

The catalyst of the present subject matter comprises a carrier and a metals component impregnated in the carrier, and is designed to remove metals and sulfur from refinery feed sources. Feed sources include atmospheric residue, vacuum residue, or deasphalted oil, and can be obtained from crude oil. The type of crude oil or fractions of crude oil is not limited. Atmospheric residue is obtained by the atmospheric distillation of crude oil, and is a heavy oil fraction having a boiling point above 343° C. Distillation of atmospheric residue at reduced pressure produces vacuum residue, which is a heavy oil fraction boiling over 550° C. Deasphalted oil is the fraction obtained by removing asphaltene from vacuum residue by solvent extraction. The catalyst described herein is preferably used to treat feedstocks containing high levels of metals along with a high sulfur content, such as Middle East crude oil.

Catalysts prepared according to the present subject matter can be used in hydroprocessing processes to treat a plurality of feeds under wide-ranging reaction conditions, generally, for example, at temperatures in the range of about 200 to about 500° C., hydrogen pressures in the range of about 5 to 300 bar, and liquid hourly space velocities (LHSV) in the range of about 0.05 to 10 $h^{-1}$. The term "hydroprocessing" can encompass various processes in which a hydrocarbon feed is reacted with hydrogen at elevated temperature and elevated pressure (hydroprocessing reaction conditions), including hydrogenation, hydrodesulfurization, hydrodenitrogenation, hydrodemetallization, hydrodearomatization, hydrocracking, and hydrocracking under mild pressure conditions, which is also referred to as mild hydrocracking.

More specifically, "hydroprocessing" as the term is employed herein means oil refinery processes for reacting petroleum feedstocks (complex mixtures of hydrocarbon present in petroleum) with hydrogen under pressure in the presence of a catalyst to lower the concentration of at least one of sulfur, contaminant metals, nitrogen, and Conradson carbon, present in said feedstock. Hydroprocessing includes hydrocracking, and hydrotreating processes which differ by the amount of hydrogen reacted, the properties of the catalyst and the nature of the petroleum feedstock treated.

Hydrocracking is typically understood to involve the hydroprocessing of predominantly hydrocarbonaceous compounds containing at least five (5) carbon atoms per molecule ("feedstock") which is conducted: (a) at superatmospheric hydrogen partial pressure; (b) at temperatures typically below 593.3° C.; (c) with an overall net chemical consumption of hydrogen; and (d) in the presence of a solid supported catalyst containing at least one (1) hydrogenation component.

Hydrotreating is typically understood to involve the hydroprocessing of predominantly hydrocarbonaceous compounds containing at least five carbon atoms per molecule ("feedstock") for the desulfurization and/or denitrification of said feedstock, wherein the process is conducted: (a) at superatmospheric hydrogen partial pressure; (b) at temperatures typically below 593.3° C.; (c) with an overall net chemical consumption of hydrogen; and (d) in the presence of a solid supported catalyst containing at least one hydrogenation component.

Catalyst Carrier

The catalytic metals of the present subject matter are contained on a foraminous alumina carrier. The alumina used can be, for example, gamma alumina, or precursors to alumina such as boehmite or pseudoboehmite. The alumina can be peptized or not peptized. Preferably, the alumina used in preparation is a peptized pseudoboehmite which after mixing and forming is calcined to gamma alumina. The alumina compositions are typically prepared in a batch process in which the alumina is precipitated under controlled reactant concentrations and reaction conditions, including temperature, time, pH, reactant feed rates and the like. Such processes are generally known in the art (see, for example U.S. Pat. No. 4,154,812 of Sanchez et al., U.S. Pat. No. 6,403,526 of Lussier et al., and the patents cited therein, the disclosures of which are incorporated herein by reference); relevant alumina preparative methods are disclosed herein.

Catalyst Metals Component

The catalyst metals component comprises a first metals fraction and a second metals fraction. The first metals fraction comprises at least one metal selected from the Group VIB elements of the Periodic Table. Preferably, the first metals fraction comprises at least one metal selected from chromium, molybdenum, or tungsten. More preferably, the first metals fraction is a single metal. Even more preferably, the first metals fraction is molybdenum. The second metals fraction comprises at least two metals selected from Group VIIIB elements of the Periodic Table. Preferably, the second metals fraction comprises at least two metals selected from cobalt, rhodium, iridium, nickel, palladium, or platinum. More preferably, the second metals fraction comprises at least one metal from a first metal subgroup selected from cobalt, rhodium or iridium, and at least one metal from a second metal subgroup selected from nickel, palladium, or platinum. Even more preferably, the second metals fraction comprises one metal from the first metal subgroup and one metal from the second metal subgroup. Most preferably, the second metals fraction comprises cobalt and nickel.

Preferably, the total weight of the combined first metals fraction and the second metals fraction is from 3.0 to 12.0 wt % based on the total weight of the catalyst. More preferably, the total weight of the first metals fraction and the second metals fraction is from 5.0 to 10.0 wt %. Even more preferably, the total weight of the first metals fraction and the second metals fraction is from 6.0 to 8.0 wt %.

Preferably, the first metal subgroup is present in an amount from 0.5 to 2.0 wt % based on the total weight of the catalyst and the second metal subgroup is present in an amount from 0.3 to 1.0 wt % based on the total weight of the catalyst. More preferably, the first metal subgroup is present in an amount from 0.80 to 1.20 wt % and the second metal subgroup is present in an amount from 0.40 to 0.60 wt % based on the total weight of the catalyst.

Preferably, the catalyst further comprises a weight ratio of the first metals fraction to the second metals fraction ranging from 2.0 to 6.0. More preferably, the ratio of the first metals fraction to the second metals fraction ranges from 3.0 to 5.0. Even more preferably the ratio of the first metals fraction to the second metals fraction ranges from 3.5 to 4.5.

Catalyst Preparation Process

The catalyst of the present subject matter is prepared by first mixing the alumina with a solvent such as water, and if the alumina is to be peptized, also with the peptizing liquid to form a dough-like material suitable for molding, such as in extrusion molding. The mixing is typically conducted in a low energy mixer or a higher energy mixing device to combine these components. Next, the dough-like carrier material is extruded, dried and calcined. Finally, the dried/calcined extrudates are impregnated with the metal components.

Peptizing

Peptization of alumina is the process used to induce the breakdown of large alumina particles to small particles by chemical treatment to make a suitable binder for the catalyst composition. The peptizing liquid, which can include an acid and water also influences the pore structure of the catalyst and can be used to adjust the pore size distribution. The acid used to peptize the alumina is preferably selected from monoprotic acids. More preferably, the acid is selected from the group consisting of formic acid, nitric acid, hydrochloric acid, acetic acid, and mixtures thereof. Even more preferably, the acid used to peptize the alumina is hydrochloric or nitric acid. Most preferably, the peptization is conducted with nitric acid. Peptization of the alumina is preferably performed using from 1.0 to 4.0 wt % acid in the peptization process. More preferably, from 1.5 to 3.5 wt % is used. Most preferably, from 2.0 to 3.0 wt % is used. Preferably, the aqueous solution of acid, water and uncalcined pseudoboehmite alumina are fed to a mixer and mixed to produce a dough-like material having a moisture content of 50 to 65 weight percent as determined by loss on ignition measurement in air at 1750° F. The mixed solids are then formed into catalyst particles having the desired size and shape as described below.

Extrusion/Drying

After the alumina has been peptized, the resultant dough-like material is first extruded to form an extrudate in equipment well known in the art such as ram extruders, single screw extruders or twin-screw extruders. After extrusion, the extrudates can be dried at temperatures from 100 to 200° C. for a period of 10 minutes to 48 hours or calcined at 400 to 900° C. for a period of 0.5 to 48 hours. The extrudate may also be dried as described above followed by calcination as described above. Preferably, the shape of the dried/calcined extrudate includes square pillar, cylindrical, trilobe, or quadralobe. Preferably, the particle diameter of the extrudate is 0.2 to 10.0 mm. More preferably, the particle diameter is 0.8 to 3.0 mm.

Following drying/calcination, the active metals are impregnated into the carrier by contacting the metals-containing solution with the carrier, so that the metals are deposited in the pores of the carrier. The metals-containing solution can be prepared by dissolving metallic compounds in a solvent where the metallic compounds are preferably present as an oxide, a nitrate, or a carbonate. The metals in the metals-containing solution can be impregnated by any method known in the art. Preferably, the metals impregnation is performed by the incipient wetness impregnation method. In this impregnation method, the amount of active metal adhering to the carrier can be controlled by adjusting the concentration of the active metal in the solution, or the amount of the solution to be used.

Following impregnation, the impregnated carrier can be dried at a temperature of 100 to 200° C. for a period of 10 minutes to 48 hours or calcined at a temperature of 400 to 700° C. for a period of 0.5 to 48 hours. Preferably, the impregnated carrier can be first dried and then calcined, as described above. Preferably, the metals of the first metals fraction are impregnated separately from the second metals fraction, where the separate impregnations are separated by a drying and/or calcination step.

Alternately, the metals can be impregnated into the carrier by adding the metals-containing solutions to the alumina in the peptizing step with the acid and water. The resulting material is extruded, dried and optionally calcined as described above.

Catalyst Pore Size Distribution

The preparation of the catalyst as described above results in a specially designed pore volume distribution, where the largest fraction of the pore volume is within pores having a diameter of 12 to less than 16 nm, an intermediate amount of pore volume from pores having a diameter of 2 to less than 12 nm, and the least amount of pore volume from pores having a diameter of 16+nm (i.e., pores 16 nm and greater). The overall construction of the pore size network represented by the combination of the specified levels of pore volume in these particular pore size ranges, in conjunction with the three-metal design is particularly selected to provide an optimum balance of catalytic activity, which is favored by smaller pores, and the ability to accumulate and process metals to prevent pore blockage, which is favored by larger pores.

Unless otherwise stated, pore volumes and distributions, and catalyst surface areas are determined by the methods described below.

"Total pore volume" as used in this specification means the cumulative volume in cc/g of all pores discernable by nitrogen desorption. For catalyst support or carrier particles and particularly for alumina powder, the pore diameter distribution and pore volume can be calculated with reference to nitrogen desorption isotherm (assuming cylindrical pores) using the using the well-known calculation method described by E. P. Barrett, L. G. Joyner and P. P. Halenda ("BJH"), "The Determination of Pore Volume and Area Distributions in Porous Substances. I. Computations from Nitrogen Isotherms," J. Am. Chern. Soc., 1951, 73 (1), pp 373-380.

The total nitrogen pore volume of a sample is the sum of the nitrogen pore volumes as determined by the above described nitrogen desorption method and BJH calculation.

"Surface area" in this specification refers herein to the specific surface area determined by nitrogen adsorption using the BET technique as described above by S. Brunauer, P. Emmett, and E. Teller in the Journal of The American Chemical Society, 60 (2), pp 309-319 (1938).

All morphological properties involving weight, such as pore volume, PV (cc/g) or surface area, (SA) ($m^2/g$) can be normalized to a "metals free basis in accordance with procedures well-known in the art. However, the morphological properties reported herein are on an "as-measured" basis without correcting for metals content.

The total volatiles (TV) of the alumina was measured by loss on ignition in air at 1750° F. $Na_2O$ was measured by ICP atomic emission spectroscopy or X-ray fluorescence.

Pores of less than 12 nm (2 nm to <12 nm)

The pore volume of pores in the catalyst whose pore diameter is less than 12 nm, i.e., pores of 2 nm to less than 12 nm is typically 0.15 mL/g to less than 0.28 mL/g. For the purposes of this specification, the pore volume in the range of 2 nm to <12 nm is referred to as a second pore volume. Preferably, the pore volume is 0.16 to 0.25 mL/g, more preferably, 0.17 to 0.22 mL/g. Pore volume in the 2 nm to <12 nm range typically represents 20.0 to 45.0%, preferably 22.0 to 37.0%, and more preferably, 25.0 to 32.0% of total pore volume.

Pores from 12 nm to <16 nm

The pore volume of pores in the catalyst whose pore diameter is from 12 nm to <16 nm is typically from 0.28 mL/g to less than 0.45 mL/g. For the purposes of this specification, pore volume in the range of pores from 12 nm to <16 nm is referred to as the first pore volume. Preferably, the pore volume is 0.30 to 0.40 mL/g. More preferably, the pore volume is 0.32 to 0.36 mL/g. The pore volume in the pore diameter from 12 nm to <16 nm is typically 37.0 to 75.0%, preferably, 42.0 to 60.0%, more preferably 47.0 to 53.0% of total pore volume.

Pores from 12 to 60 nm

Typically, the pore volume of pores in the catalyst whose pore diameter is from 12 to 60 nm is from 0.32 mL/g to 0.60 mL/g. Preferably, the pore volume of the pores is 0.42 mL/g to 0.55 mL/g. More preferably, the pore volume of the pores is 0.46 to 0.52 mL/g. Typically, the pore volume in the range of 12 nm to 60 nm constitutes 53.0 to 80.0% of total pore volume. Preferably, the pore volume in the range of 12 nm to 60 nm constitutes 60.0 to 77.0% of total pore volume. More preferably, the pore volume in the range of 12 nm to 60 nm constitutes 67.0 to 74.0% of total pore volume.

Pores from 16 to 60 nm

Typically, the pore volume of pores in the catalyst whose pore diameter is from 16 nm to 60 nm is from 0.01 mL/g to 0.20 mL/g. For the purposes of this specification, pore volume in the pore range from 16 to 60 nm is referred to as the third pore volume. Preferably, pore volume in this range is 0.02 mL/g to 0.19 mL/g. More preferably, pore volume in this range is from 0.10 to 0.18 mL/g. Pores in the range of 16 nm to 60 nm constitute 1.0 to 28.0%, preferably, 8.0 to 27.0%, and more preferably 15.0 to 26.0% of total pore volume.

Total Pore Volume

The total pore volume for the hydroprocessing catalyst is typically 0.63 to 0.75 mL/g. Preferably, the total pore volume is 0.64 to 0.74 mL/g. More preferably, the total pore volume is 0.65 to 0.73 mL/g.

Surface Area

The specific surface area (SA) of the hydroprocessing catalyst of the present subject matter is typically 180-230 $m^2/g$. Preferably, the specific surface area is 185-225 $m^2/g$, more preferably, the specific surface area is 190-220 $m^2/g$.

Phosphorus Content

Preferably, the hydroprocessing catalyst contains a maximum phosphorus content of 1000 ppm, on the basis of the total mass of the hydroprocessing catalyst. More preferably, the maximum phosphorus content of the hydroprocessing catalyst is 200 ppm. If the hydroprocessing catalyst contains greater amounts of phosphorus, the resultant metals deposition on the catalyst can be too high, thereby plugging the pore mouth of the catalyst.

Median Pore Diameter (MPD)

Preferably, the median pore diameter of the hydroprocessing catalyst of the present subject matter is 10.0 to 16.0 nm. Preferably, the median pore diameter is from 11.0 to 15.0 nm. More preferably, the median pore diameter is from 13.4 to 14.3 nm. For the purposes of this specification, median pore diameter means the pore diameter above which half of the pore volume lies in pore of a larger diameter according to the pore size distribution.

The following Examples further detail and explain the performance of the inventive process. Those skilled in the art will recognize many variations that are within the spirit of the invention and scope of the claims.

EXAMPLES

In the Examples, catalyst activity testing was performed using Middle East feedstock as described in the procedure shown below. The characteristics of the Middle East feedstock were as follows:

Content $C_{S0}$ of sulfur content: 2.1 mass %, measured according to JIS K2541.

Content $C_{V0}$ of vanadium: 15.0 mass ppm, measured according to JIS K0116.

Content $C_{Ni0}$ of nickel: 7.0 mass ppm, measured according to JIS K10116.

Example 1

Preparation of the Example 1 hydroprocessing catalyst was performed by first obtaining a carrier dough by adding nitric acid and water to the raw material powder containing pseudoboehmite alumina having a nitrogen pore volume of 1.02 cc/g, a surface area of 350 m$^2$/g, a Na$_2$O content of 0.05 wt % and a Total Volatility of 35.0 wt %, and then kneading. 2.0 wt % HNO$_3$ was used based on the total weight of the carrier dough (alumina, acid and water). An extrudate was obtained by extruding the obtained dough. The obtained extrudate was dried at 130° C. for 18 hours and then calcined at 800° C. for 1 hour. A solution of ammonium molybdate, obtained by dissolving molybdenum trioxide (MoO$_3$) in an ammonia solution, was impregnated into the obtained carrier. The percentage of molybdenum in the final catalyst is as shown in Table 1. The carrier was dried at 130° C. for 18 hours. A solution containing nickel nitrate and cobalt nitrate was prepared and then impregnated into the dried carrier, to produce a catalyst having cobalt and nickel contents in the final catalyst as shown in Table 1. The carrier impregnated with the solutions of nickel and cobalt were then dried at 130° C. for 18 hours. The dried carrier was calcined for 25 minutes at 450° C., to produce the catalyst.

The contents of molybdenum, nickel, and cobalt in the Example 1 catalyst were measured by ICP emission spectrochemical analysis and are as shown in Table 1. Pore size distribution of the pores, specific surface area and median pore diameter of the catalyst of the Example 1 was measured by the methods described above. Results are shown in Table 1.

Catalyst Activity Testing Procedure

Experiments were conducted to test the hydrodesulfurization (HDS), hydrodemetallization (HDM), hydrodenickelization (HDNi) and hydrodevanadization (HDV) activities of Example 1. A fixed-bed reactor was filled with Example 1 catalyst. The catalyst was contacted with a flow of hydrogen gas and Middle East feed stock oil under the following conditions:

Hydrogen partial pressure—14.0 MPa
Liquid hourly space velocity (LHSV)—1.6 h$^{-1}$
Hydrogen gas to oil ratio—928 Nm$^3$/m$^3$ The fixed-bed reactor was held at four different temperatures sequentially: 340° C., 360° C., 380° C. and 390° C. At each temperature, the concentrations of sulfur ($C_S$), vanadium ($C_V$) and nickel ($C_{Ni}$) in the product oil were measured using methods previously described above. Assuming first-order kinetics in a plug flow reactor, reaction rate constants were calculated for HDM (equation 1A), HDNi (equation 1B) and HDV (equation 1C) reactions at each temperature where $C_{V0}$ and $C_{Ni0}$ are the concentrations of vanadium and nickel in the feed oil. Reaction rate constants for HDS were calculated at each temperature assuming second-order reaction kinetics in a plug flow reactor (equation 1D) where $C_{S0}$ denotes the concentration of sulfur in the feed oil and do denotes the feed oil density.

$$k_{HDM} = LHSV*\ln[(C_{V0}+C_{Ni0})/(C_V+C_{Ni})] \quad \text{(equation 1A)}$$

$$k_{HDNi} = LHSV*\ln[C_{Ni0}/C_{Ni}] \quad \text{(equation 1B)}$$

$$k_{HDV} = LHSV*\ln[C_{V0}/C_V] \quad \text{(equation 1C)}$$

$$k_{HDS} = LHSV/(C_{S0}*d_0/3.208)*(C_{S0}/C_S-1) \quad \text{(equation 1D)}$$

Using the Arrhenius equation (equation 2), the inverse absolute temperature (1/T), where temperature is in kelvin, was plotted versus the natural log of the rate constants (obtained from equations 1A to 1D), and a best fit regression line calculated using the least squares method. Using these regression lines, a calculated reaction rate constant ($k_{t,c}$) at 380° C. was calculated for each type of reaction (HDM, HDNi, HDV & HDS) for each sample. See Tables 2 and 3 for examples.

$$\ln k = -(E/R)*(1/T) + \ln A \quad \text{(equation 2)}$$

where:
k=the reaction rate constant for each individual reaction (HDM, HDNi, HDV or HDS)
E=the activation energy
R=the gas constant
A=the frequency factor
T=temperature in kelvin For ease of comparison, relative reaction activities were calculated for each example catalyst and are presented as percentages in Table 1. These relative activities are calculated by dividing the calculated reaction rate constant ($k_{t,c}$) for each example by the reference case calculated rate constant. Unless otherwise noted, catalyst activity testing for all the samples was performed as with Example 1. The reference case estimated rate constants were measured as described above except that the fixed-bed reactor was filled with a two layer, 60:40 mix by weight of comparative example 1 catalyst followed by comparative example 2 catalyst. By definition, the relative reaction activities of the reference case are 100%. See tables 2 and 3 for examples.

Example 2

In Example 2, the preparation of the hydroprocessing catalyst was performed in the same manner as Example 1 except that alumina powder Versal 250, commercially available from UOP was used. Versal 250 has a nitrogen pore volume of 0.82 cc/g, a surface area of 350 m$^2$/g, a Na$_2$O content of 0, and a volatility of 25.0 wt %. Further, 3.0 wt % $HNO_3$ based on the total weight of the carrier dough (alumina, acid and water), was utilized in the preparation. The hydroprocessing testing and catalyst characterization of Example 2 was carried out in the same manner as Example 1. Results are as shown in Table 1. Finally, the demetallization activity, HDNi activity, HDV activity, HDNi activity/ HDV activity, and desulfurization activity of Example 2 were measured in the same manner as Example 1. Results are shown in Table 1.

Example 3

The hydroprocessing catalyst of Example 3 was prepared in the same manner as Example 1 except that pseudoboehmite alumina powder having a nitrogen pore volume of 0.99 cc/g, a surface area of 350 $m^2$/g, a $Na_2O$ content of 0.05 wt %, and a volatility of 32.0 wt % was used. Further, 2.0 wt % c $HNO_3$ based on the total weight of the carrier dough (alumina, acid and water), was utilized in the preparation. The hydroprocessing testing and catalyst characterization of Example 3 was carried out in the same manner as Example 1 except for the change in hydroprocessing catalyst. Results are shown in Table 1. Finally, the demetallization activity, HDNi activity, HDV activity, HDNi activity/HDV activity, and desulfurization activity of the Example 3 were measured in the same manner as the Example 1. Results are shown in Table 1.

Comparative Example 1

The hydroprocessing catalyst of Comparative Example 1 was produced using the alumina powder of Example 2 to prepare the carrier according to Example 1. Further, 0.5 wt % $HNO_3$ based on the total weight of the carrier dough (alumina, acid and water), was utilized in the preparation. The carrier was then impregnated as described in Example 1 with an ammonium molybdate solution to produce the molybdenum content shown in Table 1. After drying, the carrier impregnated with molybdenum was then impregnated with nickel as described in Example 1 with a nickel nitrate solution to produce a catalyst having a nickel content as shown in Table 1. Cobalt was not impregnated onto the carrier. The carrier was dried at 130° C. for 18 hours and then calcined for 25 minutes at 450° C. The hydroprocessing testing and catalyst characterization of Comparative Example 1 was carried out in the same manner as Example 1 except for the change in hydroprocessing catalyst. Results are shown in Table 1. Finally, the demetallization activity, HDNi activity, HDV activity, HDNi activity/HDV activity, and desulfurization activity of Comparative Example 1 was measured in the same manner as the Example 1 except that the fixed-bed reactor was filled with a two layer, 60:40 mix by weight of Comparative Example 1 followed by Comparative Example 2. Results are shown in Table 1.

Comparative Example 2

The catalyst of Comparative Example 2 was produced in a manner identical to that of Example 1 except that a pseudoboehmite powder having a nitrogen pore volume of 0.94 cc/g, a surface area of 350 $m^2$/g, a $Na_2O$ content of 0.05 wt %, and a volatility of 34.0 wt % was used. The carrier calcination was conducted at 740° C. Further, 4.0 wt % $HNO_3$ based on the total weight of the carrier dough (alumina, acid and water), was utilized in the preparation. Testing and characterization of the Comparative Example 2 catalyst was also the same as in Example 1. Results are shown in Table 1. Finally, the demetallization activity, HDNi activity, HDV activity, HDNi activity/HDV activity, and desulfurization activity of Comparative Example 2 were measured in the same manner as the Example 1 except that the fixed-bed reactor was filled with a two layer, 60:40 mix by weight of Comparative Example 1 followed by Comparative Example 2.

Comparative Example 3

The hydroprocessing catalyst of Comparative Example 3 was prepared as in Comparative Example 1 except that the peptization conditions were adjusted and the impregnation conditions were adjusted to achieve the molybdenum and nickel concentrations of Table 1. Cobalt was not impregnated in the catalyst. Further, 3.0 wt % $HNO_3$ based on the total weight of the carrier dough (alumina, acid and water) was utilized in the preparation. Testing and characterization of the Comparative Example 3 catalyst was also the same as in Example 1. Results are shown in Table 1. Finally, the demetallization activity, HDNi activity, HDV activity, HDNi activity/HDV activity, and desulfurization activity of Comparative Example 3 were measured in the same manner as the Example 1.

Comparative Example 4

The hydroprocessing catalyst of Comparative Example 4 was prepared as in Comparative Example 1 except that the alumina of Example 3 was used. Further, 2.0 wt % $HNO_3$ based on the total weight of the carrier dough (alumina, acid and water), was utilized in the preparation. The hydroprocessing testing and catalyst characterization in Comparative Example 4 was also carried out in the same manner as Comparative Example 1. Results are shown in Table 1. Finally, the demetallization activity, HDNi activity, HDV activity, HDNi activity/HDV activity, and desulfurization activity of the comparative example 4 were measured in the same manner as the Example 1. Results are shown in Table 1.

Comparative Example 5

The hydroprocessing catalyst for Comparative Example 5 was prepared as with Comparative Example 3 except that alumina powder of Example 3 was used. Further, 2.0 wt % $HNO_3$ based on the total weight of the carrier dough (alumina, acid and water), was utilized in the preparation. The hydroprocessing testing in Comparative Example 5 was also carried out in the same manner as Comparative Example 3. Characterization of the hydroprocessing catalyst of Comparative Example 5 was performed in the same manner as the Example 1. Results are shown in Table 1. Finally, the demetallization activity, HDNi activity, HDV activity, HDNi activity/HDV activity, and desulfurization activity of the comparative example 5 were measured in the same manner as Example 1. Results are shown in Table 1.

Comparative Example 6

The hydroprocessing catalyst for Comparative Example 6 was prepared as with Comparative Example 1 except that the alumina of Example 1 was used. Further, 0.5 wt % $HNO_3$ based on the total weight of the carrier dough (alumina, acid and water), was utilized in the preparation. The hydroprocessing testing and catalyst characterization of Comparative Example 6 was also carried out in the same manner as Comparative Example 1. Results are shown in Table 1. Finally, the demetallization activity, HDNi activity, HDV activity, HDNi activity/HDV activity, and desulfurization activity of the comparative example 6 were measured as in Example 1. Results are shown in Table 1.

TABLE 1

|  |  | Example 1 | Example 2 | Example 3 | Comp. Ex 1 | Comp. Ex 2 | Comp. Ex 3 | Comp. Ex 4 | Comp. Ex 5 | Comp. Ex 6 |
|---|---|---|---|---|---|---|---|---|---|---|
| Molybdenum | wt % | 6.2 | 6.2 | 6.2 | 6.0 | 6.2 | 7.0 | 6.0 | 7.0 | 6.0 |
| Nickel | wt % | 0.5 | 0.5 | 0.5 | 1.5 | 0.5 | 1.75 | 1.5 | 1.75 | 1.5 |
| Cobalt | wt % | 1.0 | 1.0 | 1.0 | 0.0 | 1.0 | 0.0 | 0.0 | 0.0 | 0.0 |
| Surface Area | m$^2$/g | 203 | 192 | 193 | 173 | 197 | 208 | 196 | 190 | 199 |
| Pore Volume | mL/g | 0.680 | 0.685 | 0.691 | 0.838 | 0.631 | 0.663 | 0.690 | 0.671 | 0.694 |
| MPD | nm | 13.39 | 13.51 | 14.26 | 20.01 | 10.76 | 12.65 | 13.83 | 14.10 | 14.16 |
| PV: 2.0 to <12.0 nm | mL/g | 0.214 | 0.217 | 0.178 | 0.141 | 0.558 | 0.277 | 0.220 | 0.198 | 0.190 |
| PV ≥ 12 nm | mL/g | 0.465 | 0.464 | 0.511 | 0.692 | 0.070 | 0.385 | 0.467 | 0.472 | 0.504 |
| PV: 12 nm to <16 nm | mL/g | 0.357 | 0.323 | 0.337 | 0.124 | 0.045 | 0.287 | 0.310 | 0.312 | 0.463 |
| PV ≥ 16 nm | mL/g | 0.107 | 0.141 | 0.173 | 0.568 | 0.024 | 0.098 | 0.157 | 0.160 | 0.041 |
| PV < 10 nm | mL/g | 0.128 | 0.093 | 0.103 | 0.059 | 0.203 | 0.170 | 0.107 | 0.110 | 0.119 |
| PV: 10 nm to <20 nm | mL/g | 0.515 | 0.541 | 0.532 | 0.354 | 0.409 | 0.463 | 0.521 | 0.498 | 0.550 |
| PV ≥ 20 nm | mL/g | 0.035 | 0.048 | 0.054 | 0.419 | 0.015 | 0.028 | 0.060 | 0.062 | 0.025 |
| PV ≥ 30 nm | mL/g | 0.012 | 0.016 | 0.020 | 0.028 | 0.008 | 0.013 | 0.022 | 0.024 | .013 |
| PV: 2.0 to <12.0 nm | % | 31.4 | 31.8 | 25.8 | 16.8 | 88.3 | 41.8 | 32.0 | 29.5 | 27.3 |
| PV ≥ 12 nm | % | 68.3 | 67.8 | 73.9 | 82.6 | 11.0 | 58.1 | 67.7 | 70.3 | 72.7 |
| PV: 12 to <16 nm | % | 52.5 | 47.2 | 48.8 | 14.8 | 7.2 | 43.3 | 44.9 | 46.5 | 66.7 |
| PV ≥ 16 nm | % | 15.8 | 20.6 | 25.1 | 67.8 | 3.8 | 14.8 | 22.8 | 23.8 | 5.9 |
| Relative HDS activity | % | 123 | 105 | 106 | 100 | 103 | 103 | 98 | 95 |
| Relative HDM activity | % | 104 | 98 | 95 | 100 | 94 | 91 | 81 | 93 |
| Relative HDNi activity | % | 121 | 113 | 109 | 100 | 100 | 97 | 86 | 96 |
| Relative HDV activity | % | 98 | 95 | 90 | 100 | 92 | 88 | 79 | 92 |
| HDNi activity/HDV activity | % | 123 | 119 | 121 | 100 | 109 | 110 | 109 | 104 |

TABLE 2

| Temperature | | 1000/T | Example 1 | | Comp Ex. 1 & 2 | |
|---|---|---|---|---|---|---|
| ° C. | K | (K$^{-1}$) | k$_{HDM}$ | lnk$_{HDM}$ | k$_{HDM}$ | lnk$_{HDM}$ |
| 340 | 613.15 | 1.631 | 0.5118 | −0.6699 | 0.5749 | −0.5536 |
| 360 | 633.15 | 1.579 | 0.7950 | −0.2295 | 0.7994 | −0.2238 |
| 380 | 653.15 | 1.531 | 1.1017 | 0.0969 | 1.0874 | 0.0838 |
| 390 | 663.15 | 1.508 | 1.2864 | 0.2519 | 1.1809 | 0.1662 |
| Calculated k$_{HDM, C}$ at 380° C. | | | 1.1004 | | 1.0570 | |
| Relative HDM activity (%) | | | 104 | | 100 | |

TABLE 3

| Temperature | | 1000/T | Example 1 | | Comp Ex. 1 & 2 | |
|---|---|---|---|---|---|---|
| ° C. | K | (K$^{-1}$) | k$_{HDS}$ | lnk$_{HDS}$ | k$_{HDS}$ | lnk$_{HDS}$ |
| 340 | 613.15 | 1.631 | 1.3120 | 0.2716 | 1.1541 | 0.1434 |
| 360 | 633.15 | 1.579 | 2.3776 | 0.8661 | 2.0585 | 0.7220 |
| 380 | 653.15 | 1.531 | 4.3966 | 1.4808 | 3.5736 | 1.2736 |
| 390 | 663.15 | 1.508 | 5.6097 | 1.7245 | 4.4634 | 1.4959 |
| Calculated k$_{HDS, C}$ at 380° C. | | | 4.3037 | | 3.5100 | |
| Relative HDS activity (%) | | | 123 | | 100 | |

As shown in Table 1, it was confirmed that the hydroprocessing catalysts of Examples 1-3 demonstrated excellent performance in demetallization and desulfurization activity compared with the catalysts of the Comparative Examples 1-6. The examples of the invention demonstrate higher relative HDS activity than the comparative examples. Additionally, nickel which is generally more difficult to remove than vanadium, is removed with substantially greater selectivity and activity by examples of the invention than by the comparative examples.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be affected without departing from the spirit and scope of the invention as described and claimed.

We claim:

1. A catalyst comprising a carrier and a metals component impregnated in the carrier,
    the carrier comprising alumina; and
    the metals component comprising a first metals fraction and a second metals fraction, the first metals fraction comprising at least one metal selected from chromium, molybdenum, or tungsten, and the second metals fraction comprising at least two metals selected from cobalt, rhodium, iridium, nickel, palladium, or platinum,
    wherein the catalyst has a first pore volume of 0.28 to 0.45 mL/g for pores having a pore diameter of 12 nm to less than 16 nm, and a second pore volume of 0.15 to 0.28 mL/g for pores of 2.0 nm to less than 12.0 nm.

2. The catalyst of claim 1 further comprising a ratio of the first metals fraction to the second metals fraction ranging from 2.0 to 6.0.

3. The catalyst of claim 1 wherein the second metals fraction comprises at least one metal from a first metal subgroup selected from cobalt, rhodium or iridium, and at least one metal from a second metal subgroup selected from nickel, palladium, or platinum.

4. The catalyst of claim 3 wherein the first metal subgroup is present in an amount from 0.5 to 2.0 wt % based on the total weight of the catalyst and the second metal subgroup is present in an amount from 0.3 to 1.0 wt % based on the total weight of the catalyst.

5. The catalyst of claim 3 wherein the second metals fraction comprises one metal from the first metal subgroup and one metal from the second metal subgroup.

6. The catalyst of claim 1 wherein the total weight of the first metals fraction and the second metals fraction is from 3.0 to 12.0 wt % based on the total weight of the catalyst.

7. The catalyst of claim 1 wherein the first metals fraction is molybdenum.

8. The catalyst of claim 1 wherein the second metals fraction comprises cobalt and nickel.

9. The catalyst of claim 1 wherein the metals component comprises molybdenum, cobalt and nickel.

10. The catalyst of claim 1 wherein the first pore volume is 0.30 to 0.40 mL/g.

11. The catalyst of claim 10 wherein the first pore volume is 0.32 to 0.36 mL/g.

12. The catalyst of claim 1 where the second pore volume is 0.16 to 0.25 mL/g.

13. The catalyst of claim 1 further comprising a third pore volume of 0.01 to 0.20 mL/g for pores from 16 nm to 60 nm.

14. The catalyst of claim 13 wherein the total of the first pore volume and the third pore volume is from 0.32 to 0.60 mL/g.

15. The catalyst of claim 1 further comprising a total pore volume of 0.63 to 0.75 mL/g.

16. The catalyst of claim 1 further comprising a specific surface area of 180 to 230 $m^2/g$.

17. The catalyst of claim 1 further comprising a median pore diameter of 10.0 to 16.0 nm.

18. The catalyst of claim 1 further comprising a maximum phosphorus content of 1000 ppm based on the total weight of the catalyst.

19. The catalyst of claim 18 wherein the maximum phosphorus content is 200 ppm.

20. A process for producing a catalyst, the process comprising impregnating a metals component onto a carrier,
the carrier comprising alumina; and
the metals component comprising a first metals fraction and a second metals fraction, the first metals fraction comprising at least one metal selected from chromium, molybdenum, tungsten, or mixtures thereof, and the second metals fraction comprising at least two different metals selected from cobalt, rhodium, iridium, nickel, palladium, platinum or mixtures thereof,
wherein the catalyst has a first pore volume of 0.28 to 0.45 mL/g for pores having a pore diameter of 12 nm to less than 16 nm, and a second pore volume of 0.15 to 0.28 mL/g for pores of 2.0 nm to less than 12.0 nm.

* * * * *